United States Patent
Altaf et al.

(10) Patent No.: US 8,955,153 B2
(45) Date of Patent: Feb. 10, 2015

(54) PRIVACY CONTROL IN A SOCIAL NETWORK

(71) Applicant: International Business Machines Corporation, Armonk, NY (US)

(72) Inventors: Faheem Altaf, Pflugerville, TX (US); Steven Duane Clay, Round Rock, TX (US); Eduardo N. Spring, Round Rock, TX (US); Shunguo Yan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 15 days.

(21) Appl. No.: 13/746,213

(22) Filed: Jan. 21, 2013

(65) Prior Publication Data

US 2014/0007249 A1    Jan. 2, 2014

Related U.S. Application Data

(63) Continuation of application No. 13/535,920, filed on Jun. 28, 2012.

(51) Int. Cl.
*G06F 11/00* (2006.01)
*G06F 21/62* (2013.01)

(52) U.S. Cl.
CPC .................................. *G06F 21/6245* (2013.01)
USPC ................... 726/28; 726/26; 726/27; 726/29; 726/30

(58) Field of Classification Search
CPC ................................ G06F 21/60; H04L 63/10
USPC ...................................................... 726/26–30
See application file for complete search history.

(56) References Cited

U.S. PATENT DOCUMENTS

| | | | | |
|---|---|---|---|---|
| 2005/0055379 | A1* | 3/2005 | Yamazaki et al. | 707/104.1 |
| 2007/0136466 | A1* | 6/2007 | Etelapera | 709/225 |
| 2008/0104128 | A1* | 5/2008 | Drayer et al. | 707/200 |
| 2010/0011425 | A1* | 1/2010 | Eyal | 726/5 |
| 2010/0250643 | A1  | 9/2010 | Savage et al. | 709/202 |

(Continued)

FOREIGN PATENT DOCUMENTS

| CN | 102185787 | 9/2011 |
|---|---|---|
| CN | 102185826 | 9/2011 |

OTHER PUBLICATIONS

Fischer-Huebner, S., "Privacy risks and challenges for the mobile internet" Law and Computing, 2004. The IEE Summit on 2004, pp. 98-118.*

Hakkila et al., "Role based privacy applied to context-aware mobile applications" Systems, Man and Cybernetics, 2004 IEEE International Conference on 2004, pp. 5467-5472 vol. 6.*

International Search Report and Written Opinion for International Application No. PCT/IB2013/055272, mailed Dec. 12, 2013, 9 pages.

(Continued)

*Primary Examiner* — Luu Pham
*Assistant Examiner* — Roderick Tolentino
(74) *Attorney, Agent, or Firm* — VanLeeuwen & VanLeeuwen; Jeffrey S. LaBaw (57) ABSTRACT

An approach is provided to provide privacy control in a social network. In the approach, a first post is posted from a first user to a second user in the social network with the first post including private data belonging to the first user. Subsequent postings are monitored for the first user's private data. When the monitoring detects a second post of the first user's private data with the second post being from the second user to a third user in the social network, privacy controls are performed. The privacy controls mask the first user's private data from the third user so that the first user's private data inaccessible (not visible) to the third user.

18 Claims, 8 Drawing Sheets

(56) References Cited

U.S. PATENT DOCUMENTS

| | | | |
|---|---|---|---|
| 2010/0318571 A1 | 12/2010 | Pearlman et al. | |
| 2011/0030067 A1 | 2/2011 | Wilson | 726/27 |
| 2011/0113084 A1* | 5/2011 | Ramnani | 709/201 |
| 2011/0307695 A1* | 12/2011 | Slater | 713/163 |
| 2012/0102124 A1 | 4/2012 | Hansson et al. | 709/206 |
| 2012/0159649 A1* | 6/2012 | Roger et al. | 726/28 |
| 2012/0303659 A1* | 11/2012 | Erhart et al. | 707/769 |
| 2013/0006882 A1* | 1/2013 | Galliani | 705/319 |
| 2013/0290716 A1* | 10/2013 | Gavrilov | 713/168 |

OTHER PUBLICATIONS

Office Action for U.S. Appl. No. 13/535,920, U.S. Patent and Trademark Office, mailed Dec. 24, 2013, 17 pages.

"Reputation.com launches myreputation student to help graduates establish a positive online presence," reputation.com, Jun. 2011, 2 pages.

Gayle, "Facebook now knows what you look like as it rolls out face recognition by stealth," MailOnline, Jun. 2011, 6 pages.

Brown, "IBM announces Vantage for IBM Connections and IBM Sametime," Planet Lotus, Sep. 2011, 2 pages.

* cited by examiner

PRIVACY CONTROL IN A SOCIAL NETWORK

TECHNICAL FIELD

The present disclosure relates to an approach that assists in protecting private data in a social network.

BACKGROUND OF THE INVENTION

Privacy issue in social network usually involves system breaches or exploitation of a user's private information. However, a privacy violation can occur during normal social interactions when sensitive data is relayed to a person that is outside of the originally-targeted group. One example is after a user shares his personal information (e.g., a picture, phone number) to a close circle of friends, a member of that group may accidentally or intentionally expose that sensitive information to the users outside of the group.

SUMMARY

An approach is provided to provide privacy control in a social network. In the approach, a first post is posted from a first user to a second user in the social network with the first post including private data belonging to the first user. Subsequent postings are monitored for the first user's private data. When the monitoring detects a second post of the first user's private data with the second post being from the second user to a third user in the social network, privacy controls are performed. The privacy controls mask the first user's private data from the third user so that the first user's private data inaccessible (not visible) to the third user.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary of the disclosure, as set forth above, further explaining and expanding the definitions of the various aspects and embodiments of the disclosure as necessary.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
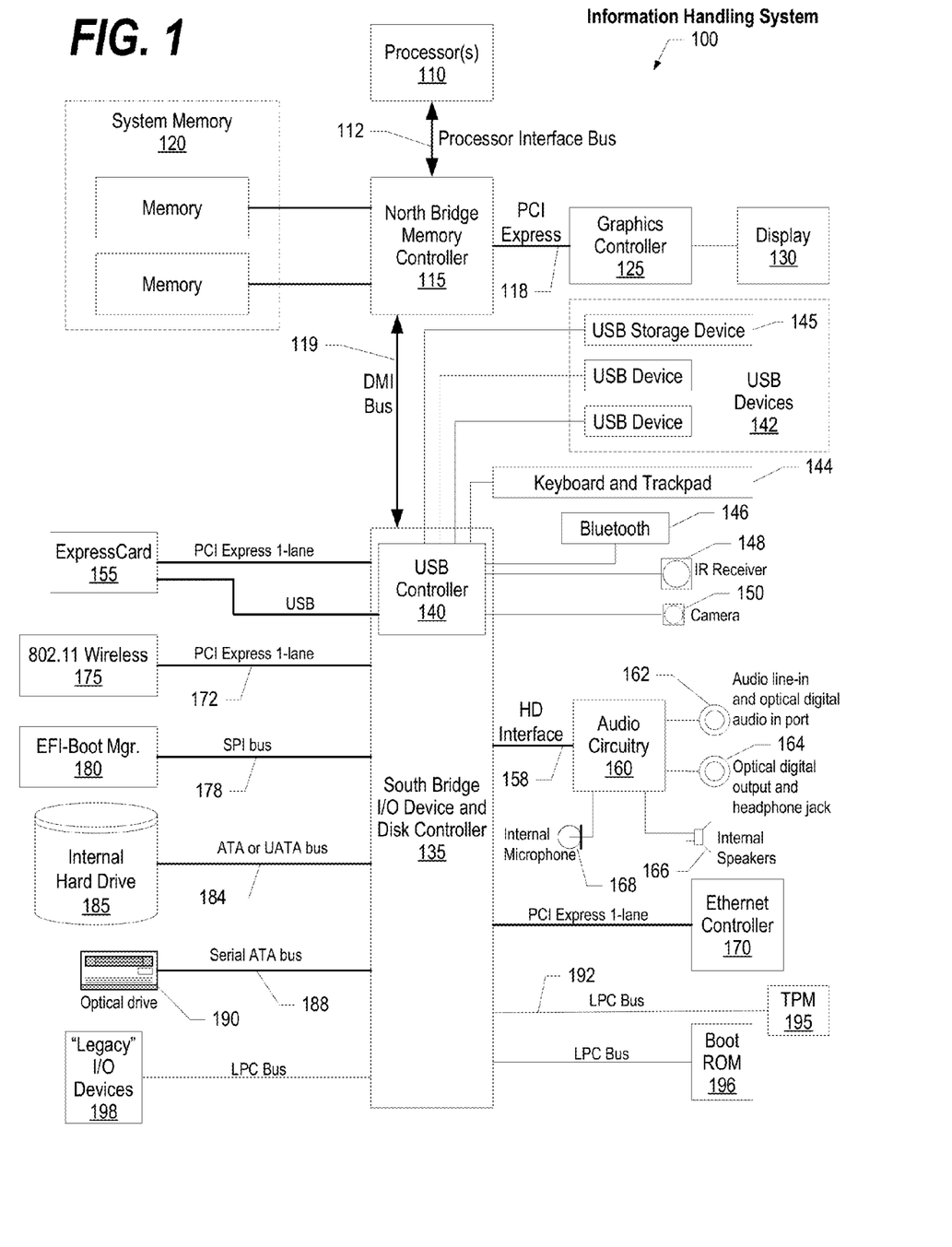
FIG. 1 is a block diagram of a data processing system in which the methods described herein can be implemented.
Figure 2:
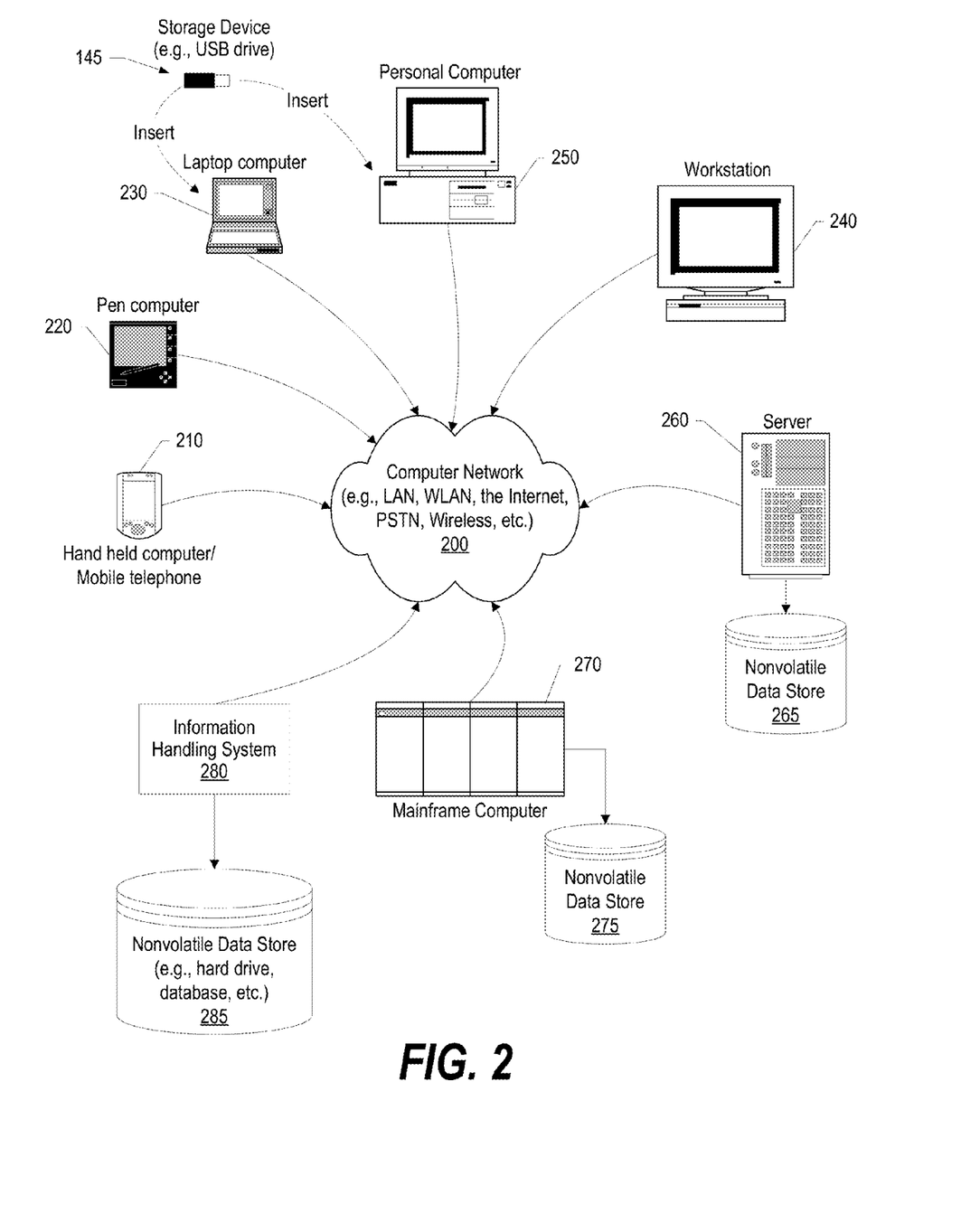
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE .802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

FIGS. 3-8 depict an approach that can be executed on an information handling system and computer network as shown in FIGS. 1-2. A social network privacy control approach identifies and monitors sensitive data to prevent the sensitive data from being relayed beyond the originally-targeted user group. The approach provides for Identification of sensitive (private) data from a post. The private data is determined from a user's privacy configuration that defines sensitive data types, patterns and matching instructions. The system monitors subsequent posts (e.g., from any receivers of the original post, etc.) for inclusion of the private data. The subsequent posts are displayed with the private data masked (not visible) using a generated pattern. The original user (the owner of the private data) is sent a notification with the message containing the private data and targeted receivers. If the original user approves a selected set of the targeted receivers for viewing the user's private data, then the private data is unmasked allowing the selected set of targeted receivers to view the original user's private data.

Figure 3:
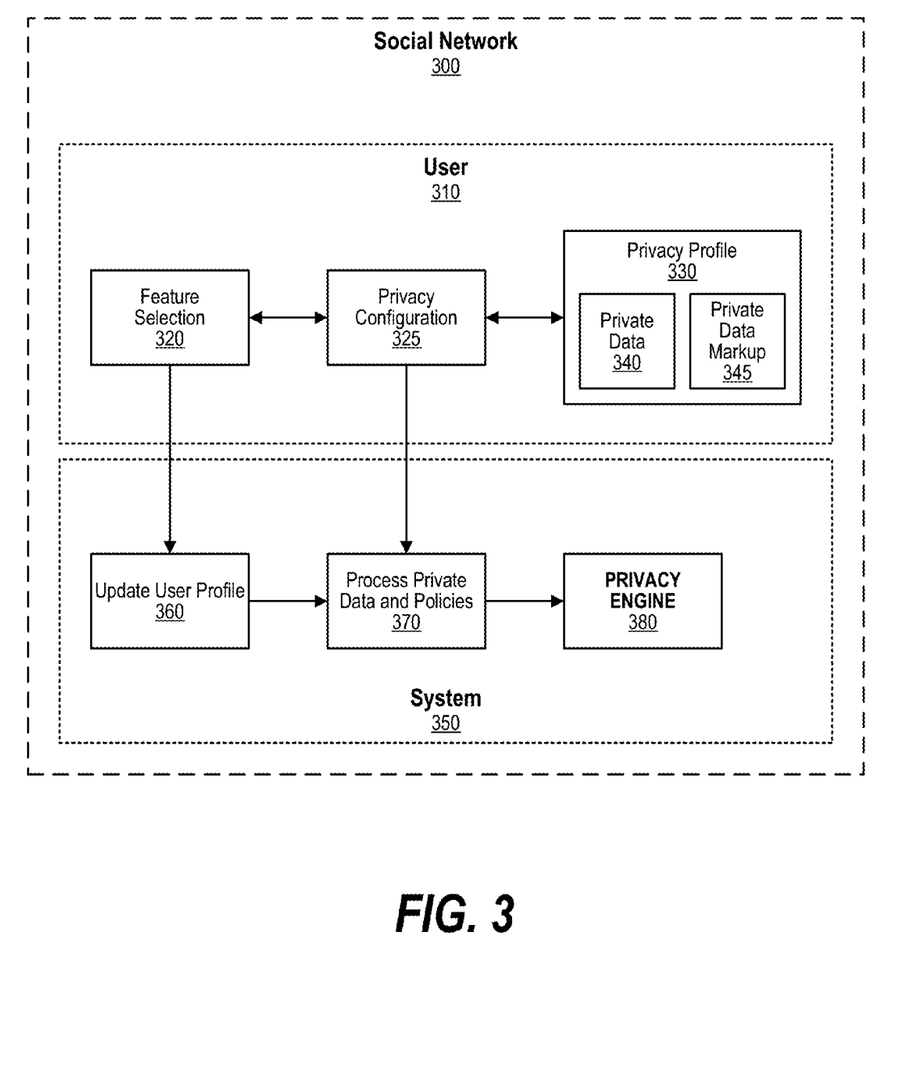
FIG. 3 is a component diagram showing various components involved in protecting users' private data.

FIG. 3 is a component diagram showing various components involved in protecting users' private data. In the implementation shown, social network includes components that are accessible by individual users (310) as well as components that, while used to process user requests, provide system (350) functionality to all of the users of social network 300. User 310 selects social network features, including privacy features, using process 320. Privacy features are used as an input to update privacy configuration process 325. The user's resulting privacy configuration data is stored in privacy profile 330. As shown, privacy profile 330 includes both the user's private data 340 as well as private data markup (masks) 345 which provide masks for the private data.

Social network system 350 receives feature selections from the user as inputs to update the user's profile (process 360). The updates to the user's profile are used as an input to the system's process used to process users' private data and policies (process 370). As shown, the system's process used to process users' private data and policies (process 370) receives inputs from both the user's privacy configuration (process 325) as well as the updates to the user profile (process 360). The private data and policies resulting from process 370 drive the social network's privacy engine 380 that controls access to private data owned by the various uses of the social network.

Figure 4:
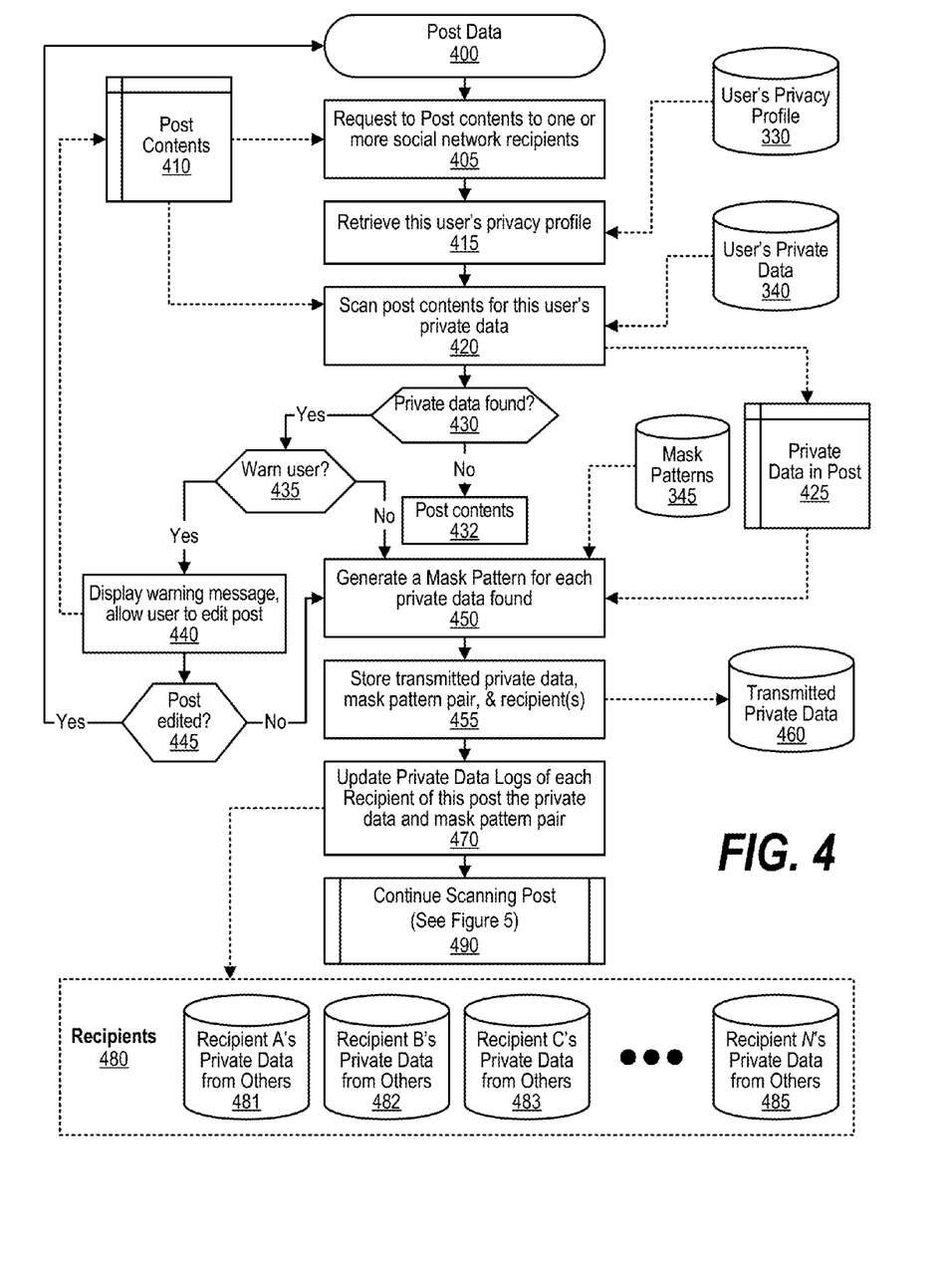
FIG. 4 is a flowchart showing steps taken to protect private data during the posting of content to a social network.

FIG. 4 is a flowchart showing steps taken to protect private data during the posting of content to a social network. Processing commences at 400 whereupon, at step 405, a first user (the owner of the private data) requests to post message contents 410 to one or more second users of the social network. At step 415, the social network's posting process retrieves the user's privacy profile from user's privacy profile data store 330. At step 420, message contents 410 being posted by the first user are scanned for the user's private data using user's privacy profile 330 and any predefined user privacy data 340.

User's privacy profile data store 330 describes types of content that the user deems private. These data descriptions are set forth as data types (e.g., image files (photographs), etc.), predetermined patterns (e.g.,###-###-#### as a pattern for phone numbers, etc.), matching instructions, and analytic algorithms. For example, the privacy profile may indicate that photographs included in the user's posts to other social network users are private. In addition, the user's private data may include specific data items, such as a particular telephone number, that the user does want disseminated to unknown parties. Process 420 is a sensitive content analyzer that compares message contents 410 with both the user's privacy profile (data store 330) as well as the user's private data (data store 340). A copy of any private data detected in message contents 410 is stored in memory area 425.

A decision is made as to whether private data was detected by the sensitive content analyzer process performed at step 420 (decision 430). If no private data was found, decision 430 branches to the "no" branch whereupon, at step 432 the message is posted to the recipients selected by the user and no further privacy processing is performed as the post was not found to contain private data. On the other hand, if private data was identified in the post, then decision 430 branches to the "yes" branch to perform further privacy processing in order to protect the user's private data.

A decision is made as to whether the user has requested (e.g., in the user's profile, etc.) to be warned when one of the user's posts includes the user's private data (decision 435). If the user has requested such a warning, then decision 435 branches to the "yes" branch whereupon, at step 440, a warning message is displayed indicating that the user's requested post includes the user's private data and the user is provided an opportunity to edit the post. In one embodiment, the identified private data is highlighted so that the user understands what data in the post was identified as the user's private data. A decision is made as to whether the user edited the contents of the post (e.g., to remove or edit the user's private data in the post) at decision 445. If the user edited the contents of the post, then decision 445 branches to the "yes" branch whereupon processing loops back to re-scan the post contents using the sensitive content analyzer as described above.

If either the user has not requested to be warned when a post includes the user's private data (decision 435 branching to the "no" branch) or if the user, after having been warned, chooses not to edit the post contents (decision 445 branching to the "no" branch), then processing is performed to protect the user's private data starting with step 450. At step 450, a mask pattern is generated for each private data identified in the user's post. For example, a blank image stating "photo not available" may be a mask when the user's private data is a photograph, and a mask such as "###-###-####" may be used when the user's private data is a telephone number. Such masks often indicate the type of data (e.g., a photograph, phone number, etc.) that is being withheld from the recipient without actually divulging the data. At step 455, the user's private data being transmitted (e.g., a phone number, photograph, etc.) is stored along with the generated mask used to hide the user's private data from unauthorized recipients, as well as a list of authorized recipients (second users) that are receiving the user's original post that includes the user's private data. This data (transmitted private data, mask pattern, and recipients) are stored in transmitted private data store 460.

At step 470, the process updates the private data logs associated with each of the authorized recipients of the user's private data along with the private data conveyed and the mask pattern used to conceal the private data from unauthorized recipients. In one embodiment, the social network maintains recipients' private data logs 480 which includes a data log for each user that has received private data from another user of the social network. In this embodiment, recipients' private data logs are maintained by the social network and are inaccessible by the individual users in order to prevent any user from tampering with the privacy control data or from viewing other users' private data without authorization. In the example shown, four separate data logs are shown corresponding to User A, User B, User C, and User N (data stores 481, 482, 483, and 485, respectively). Those skilled in the art will appreciate that many systems would combine the separately shown data stores into a single more complex data store (e.g., a database, etc.). At step 490, the privacy control measures described in FIG. 4 are continued with the flowchart shown in FIG. 5 which is a continuation of FIG. 4, with the emphasis of FIG. 5 being to protect the private data belonging to other users.

Figure 5:
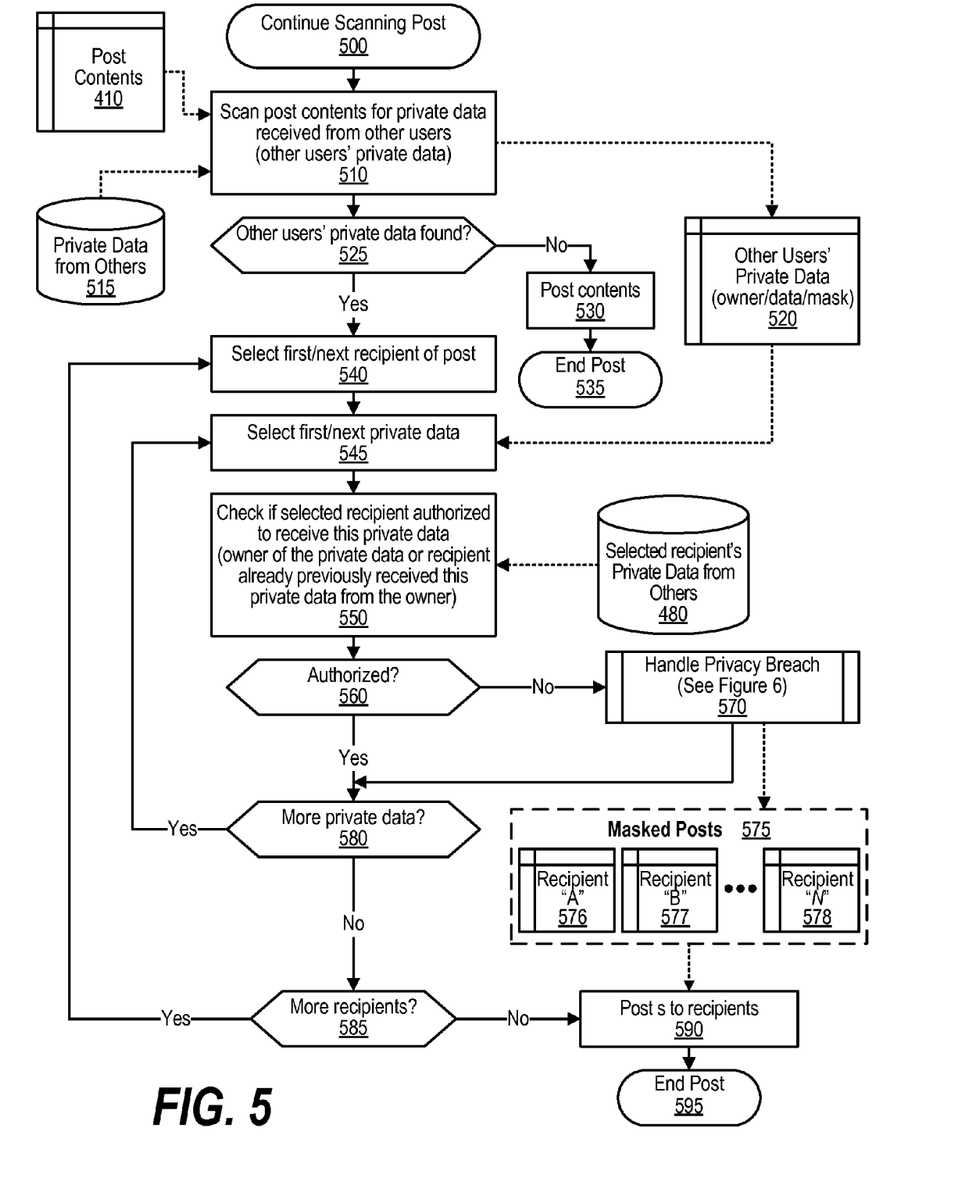
FIG. 5 is a continuation of the flowchart shown in FIG. 4 and shows continued scanning steps taken to protect private data during the posting of content to a social network.

FIG. 5 is a continuation of the flowchart shown in FIG. 4 and shows continued scanning steps taken to protect private data during the posting of content to a social network. Continued processing commences at 500 whereupon, at step 510, the user's post (message contents 410) is scanned during a monitoring process to identify whether the user's post contains private data that this user received from other users. In one embodiment, private data that this user received (as a recipient, or "second user") from other users is retrieved from private data from others data store 515 which is updated when the user previously received private data (as the recipient, or "second user") from other users (as the original poster, or "first user"). A decision is made as to whether other users' private data has been detected in the post that the user is currently attempting to send (decision 525, with this post then being a second post of the first user's private data that the current (second) user may be attempting to send to a third user). If no private data belonging to other users is detected in message contents 410, then decision 525 branches to the "no" branch whereupon, at step 530, the post is transmitted without further privacy control processing taking place and processing ends at 535.

On the other hand, if private data belonging to one or more other users (the "first users") is detected in the post contents, then decision 525 branches to the "yes" branch for further processing aimed at protecting the other users' private data. At step 540, the first recipient of the post is selected, and at step 545, the first private data detected in the post is also selected. At step 550, the privacy process checks the private data from others data store 480 in order to determine whether the selected recipient is authorized to view the selected private data (e.g., the selected recipient is the original poster (owner) of the private data or the selected recipient either already previously received this private data from the owner or has been authorized to view the private data by the owner of the private data, etc.). A decision is made as to whether the selected recipient is authorized to receive the selected private data (decision 560). If the selected recipient is not authorized to receive the selected private data, then decision 560 branches to the "no" branch whereupon, at predefined process 570, the privacy breach is handled resulting in the private data being masked in the post to the selected recipient so that the selected recipient cannot see the private data until the owner of the private data grants the selected recipient with such authorization. The result of predefined process 570 is masked posts 575 which are posts with private data masked (not visible) to particular recipients. In the example shown, masked posts are created for Recipients A, B, and N (posts 576, 577, and 578, respectively). On the other hand, if the selected recipient is authorized to view the selected private data, then decision 560 branches to the "yes" branch bypassing predefined process 570 so that the selected recipient will be able to view the private data in the post.

A decision is made as to whether there is more private data, perhaps owned by different users, detected in the user's post (decision 580). If there is more private data to process, then decision 580 branches to the "yes" branch which loops back to select and process the next private data for the selected recipient as described above. This looping continues until all of the private data has been processed for the selected recipient, at which point decision 580 branches to the "no" branch. A decision is made as to whether there are more recipients to process (decision 585). If there are more recipients to process, then decision 585 branches to the "yes" branch which loops back to select the next recipient of the post and process all of the detected private data included in the post based on the newly selected recipient as described above. This looping continues until all of the recipients have been selected and processed, at which point decision 585 branches to the "no" branch whereupon, at step 590, the "masked" posts (575) are transmitted to individual recipients (e.g., are visible to the recipients with the masks concealing other users' private data from the recipients unless the individual recipients are authorized to view such data, etc.). Post processing thereafter ends at 595.

Figure 6:
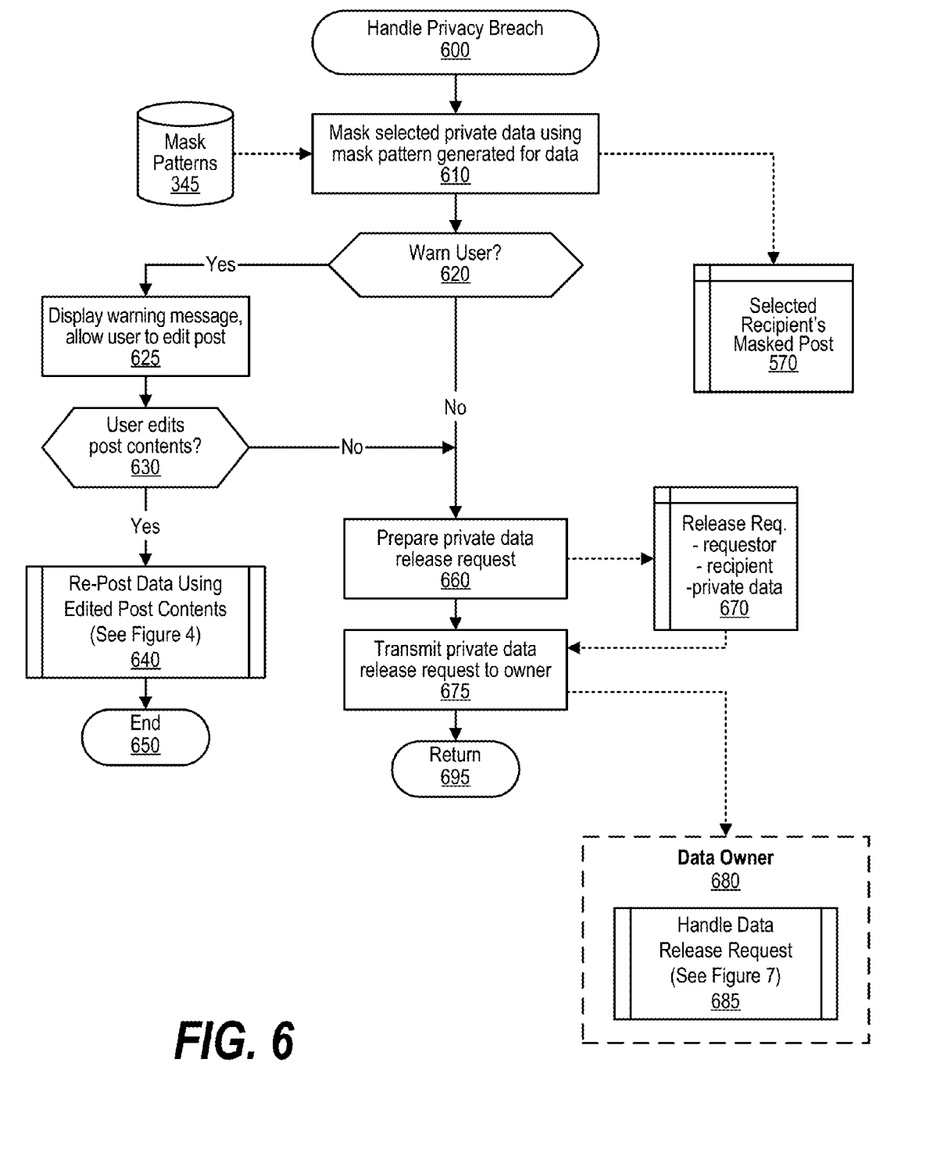
FIG. 6 is a flowchart showing steps taken to counteract a suspected privacy breach when such breach is detected.

FIG. 6 is a flowchart showing steps taken to counteract a suspected privacy breach when such breach is detected. Processing commences at 600 whereupon, at step 610, the detected private data is masked using a generated mask from data store 345 and the masked message is stored in memory area 570. A decision is made as to whether the user (the "second user") has requested (e.g., in the user's profile, etc.) to be warned when sending other users' private data to unauthorized recipients ("third users") at decision 620. If the user has requested such a warning, then decision 620 branches to the "yes" branch whereupon, at step 625, a notification is displayed to the current user (the "second user") that notifies the user that the post (the "second post") includes private data belonging to another user (the "first user", owner of the private data). In addition, at step 625, the user is provided an opportunity to edit the contents of the post. A decision is made as to whether the user edited the contents of the post (decision 630). If the user edited the contents of the post, then the entire post is re-processed at predefined process 640 (see FIG. 4 and corresponding text for processing details) and processing ends at 650.

On the other hand, if the user did not edit the contents of the post (decision 630 branching to the "no" branch) or if the user did not request to be warned if the user's posts included private data of other users (decision 620 branching to the "no" branch), then, at step 660, a private data request is prepared and stored in memory area 670. As shown, the private data request includes the requestor (the current user, also known as the "second user"), the intended recipient (the "third user") and the private data owned by the "first user" that was included in the post (and subsequently masked so that it currently is not visible to the recipient ("third user")). At step 675, the private data request (670) is transmitted to the "first user" who is the owner of the private data. The first user will receive the private data request and decide whether to allow the third user authorization to view the first user's private data. If authorization is provided, then the private data included in the post from the second user to the third user will be unmasked so that the third user is able to view the first user's private data that was included in the post by the second user. Private data owner 680 performs predefined process 685 to handle the private data request (see FIG. 7 and corresponding text for processing details). Processing then returns to the calling routine (see FIG. 5) at 695.

Figure 7:
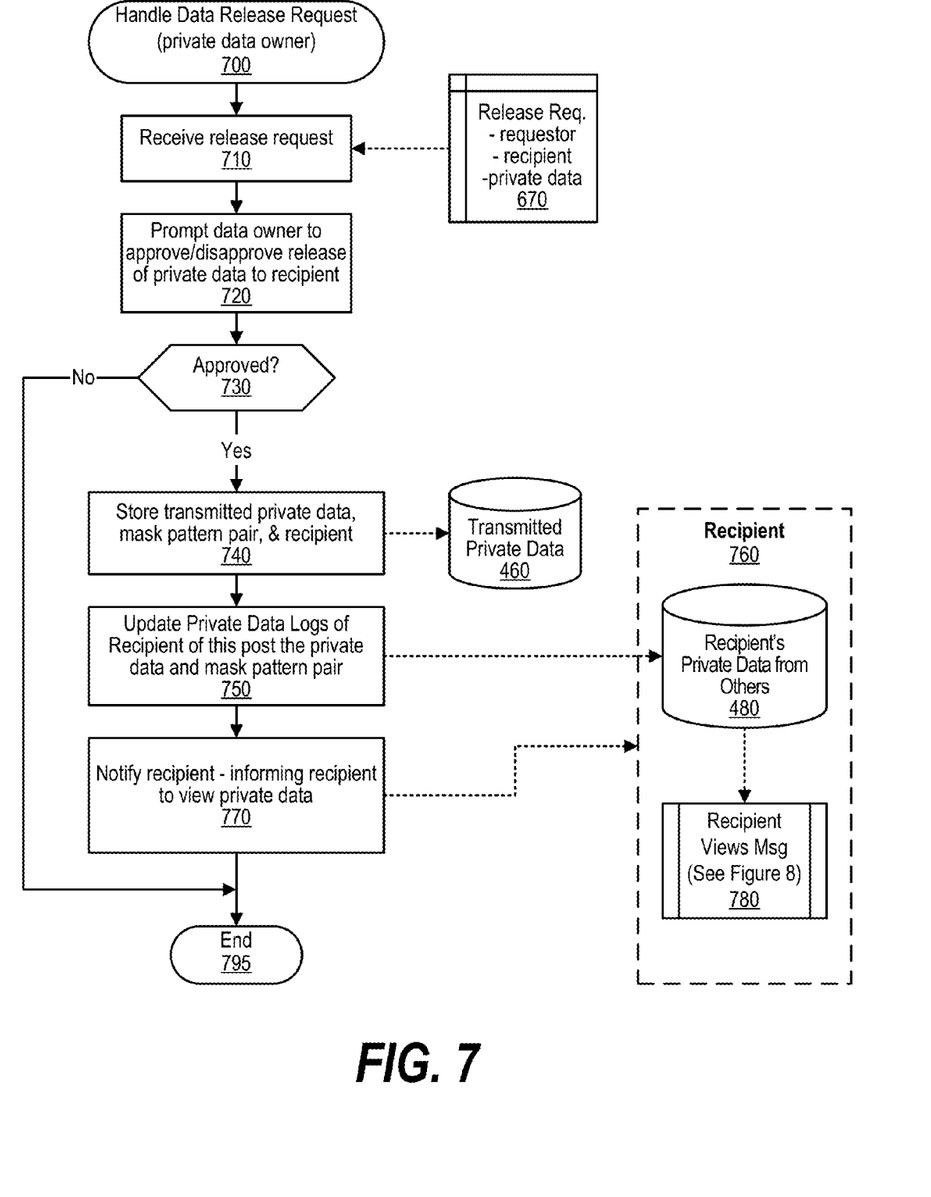
FIG. 7 is a flowchart showing steps taken to handle a private data release request received by an owner of the private data.

FIG. 7 is a flowchart showing steps taken to handle a private data release request received by an owner of the private data. Processing commences at 700 whereupon, at step 710, the owner (the "first user") receives private data request 670 which is requesting authorization for a "third user" to be able to view the first user's private data that was previously authorized for viewing by a "second user" that subsequently attempted to transmit the first user's private data to the third user. In one embodiment, private data request 670 includes an identifier of the requestor (e.g., the "second user" that is trying to disseminate the first user's private data), an identifier of the recipient (e.g., the "third user" that is receiving the post from the second user and wishes to view the first user's private data), and the first user's private data that is the subject of the request.

At step 720, the owner of the private data (the "first user") is prompted as to whether he/she wishes to approve the private data request. A decision is made as to whether the owner (first user) has approved the release of the first user's private data to the recipient (third user) at decision 730. If the owner (first user) approved the release, then decision 730 branches to the "yes" branch to perform approval processing.

Steps 740, 750, and 770 are performed as part of approval processing. At step 740, the owner's private data and mask pattern are stored in transmitted private data store 460 along with the recipient (third user) that is being authorized to view the first user's private data. At step 750, the private data log of the recipient (the third user) is updated in data store 480, thus indicating the authorization of the third user to view the first user's private data. At step 770, the owner (the first user) sends a notification to the recipient (the third user) that authorization has been granted for the third user to view the first user's private data. Now, when the recipient (third user) views the post received from the second user the private data owned by the first user will be unmasked (visible) to the third user.

Returning to decision 730, if the owner of the private data does not approve the release of the private data to the recipient (the third user), then decision 730 branches to the "no" branch bypassing steps 740, 750, and 770. Owner's processing thereafter ends at 795.

Recipient 760 (the third user) receives the authorization to view the first user's private data with the update to the recipient's private data from others data store 780 reflecting the private data owned by other users that this recipient (third user) is allowed to view. At predefined process 780, the recipient (third user) views posts with private data being masked or unmasked based upon whether authorization has been granted to view such private data (see FIG. 8 and corresponding text for processing details).

Figure 8:
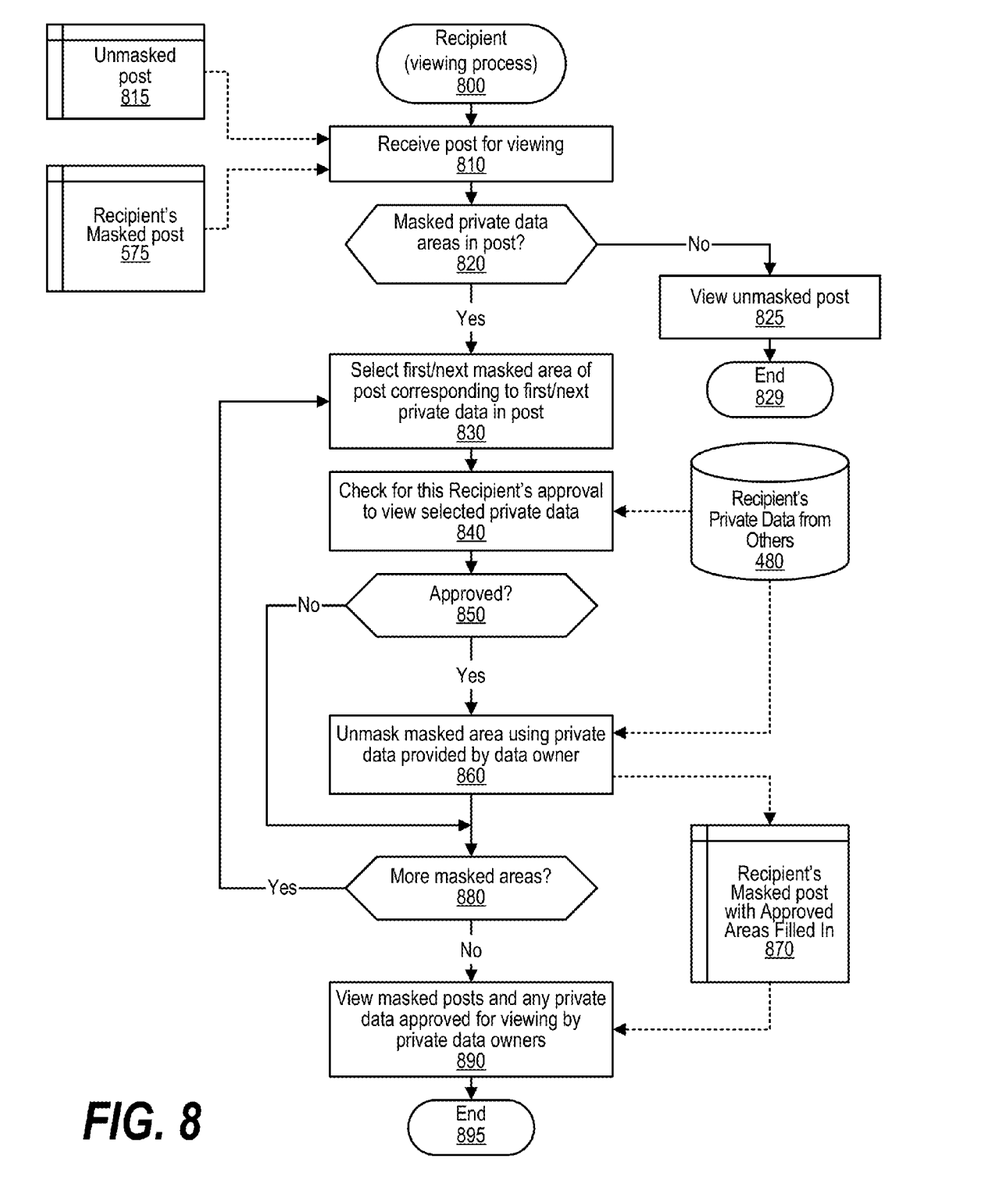
FIG. 8 is a flowchart showing processing by a recipient of a content post to a social network to selectively show other users' private data based on privacy control settings.

FIG. 8 is a flowchart showing processing by a recipient (a third user) of a content post to a social network to selectively show other users' private data based on privacy control settings. Recipient (third user) viewing processing commences at 800 whereupon, at step 810, the recipient receives a post for viewing. As shown, these posts can include unmasked posts 815 that do not contain other users' private data that this recipient not authorized to view as well as masked posts 575 which are posts with other users' private data masked (not visible) to the recipient.

A decision is made as to whether the post received includes masked areas where other users' private data has been masked and is therefore not currently visible to the recipient (decision 820). If the post does not include masked (private data), then decision 820 branches to the "no" branch whereupon, at step 825, the unmasked post is viewed by the recipient and recipient viewing processing ends at 829. On the other hand, if the received post includes masked area where other users' private data has been masked, then decision 820 branches to the "yes" branch to process the masked post.

At step 830, the first masked area in the post is selected with this selected masked area corresponding to the first occurrence of another user's private data in the post. At step 840, the viewing process checks this recipient's private data from others data store 480 in order to identify whether the owner of this private data (the first user) has authorized the recipient to view the first user's private data. A decision is made as to whether the recipient is authorized to view the private data corresponding to the selected mask (decision 850). If the recipient is authorized to view such private data, then decision 850 branches to the "yes" branch whereupon, at step 860, the process unmasks the selected area by inserting the actual contents of the owner's private data from data store 480 thereby making the owner's private data visible to the recipient and the post is updated in memory area 870. On the other hand, if the recipient has not been authorized to view the owner's private data corresponding to the selected mask, then decision 850 branches to the "no" branch bypassing step 860.

A decision is made as to whether there are additional masked areas in the post corresponding to additional references of private data owned by other users (decision 880). If there are additional masked areas to process, then decision 880 branches to the "yes" branch which loops back to select and process the next masked area as described above. This looping continues until all of the masked areas in the post have been processed, at which point decision 880 branches to the "no" branch whereupon, at step 890, the recipient views the masked post 870 will all masks corresponding to private data that has been approved for viewing by the recipient filled in (visible) and those masked areas that have not been authorized masked out so that such unauthorized private data continues to be masked (not visible) to the recipient. Processing thereafter ends at 895.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method of privacy control in a social network, the method, implemented by an information handling system, comprising:
   posting a first post from a first user to a second user in the social network, wherein the first post includes private data of the first user;
   generating a mask pattern, corresponding to the first user's private data, wherein the generated mask pattern is used to prevent one or more unauthorized users from viewing the first user's private data;
   storing the generated mask pattern and the first user's private data in a data store;
   monitoring one or more subsequent postings for the first user's private data;
   detecting, based on the monitoring, a second post of the first user's private data, the second post being from the second user to a third user in the social network;
   based on the detection, masking the first user's private data from the third user using the stored generated mask pattern, the masking making the first user's private data inaccessible to the third user;
   sending, to the first user, a private data request wherein the private data request includes the first user's private data and an identifier corresponding to the third user; and
   unmasking the first user's private data in response to receiving, from the first user, an approval of the private data request, wherein the unmasking comprises displaying the first user's private data to the third user.

2. The method of claim 1 further comprising:
   wherein the generated mask pattern is based on a data type of the first user's private data.

3. The method of claim 1 further comprising:
   identifying the first post as including the first user's private data.

4. The method of claim 3 further comprising:
   analyzing the first post using a sensitive content analyzer; and
   automatically identifying that the first user's private data is included in the first post based on the analysis of the first post.

5. The method of claim 4 further comprising:
   previously configuring, by the first user, one or more private data configuration settings, wherein the private data configuration settings are selected from the group consisting of one or more data types, one or more predetermined patterns, one or more matching instructions, and one or more analytic algorithms, wherein the analyzing utilizes the private data configuration settings.

6. The method of claim 1 further comprising:
notifying the second user that the second post includes the first user's private data; and
allowing the second user to modify the second post in response to the notification and prior to a reception of the second post by the third user.

7. An information handling system comprising:
one or more processors;
a memory coupled to at least one of the processors;
a nonvolatile storage area accessible by at least one of the processors; and
a set of instructions stored in the memory and executed by at least one of the processors to provide privacy control in a social network, wherein the set of instructions perform actions of:
posting a first post from a first user to a second user in the social network, wherein the first post includes private data of the first user;
generating a mask pattern, corresponding to the first user's private data, wherein the generated mask pattern is used to prevent one or more unauthorized users from viewing the first user's private data;
storing the generated mask pattern and the first user's private data in a data store;
monitoring one or more subsequent postings for the first user's private data;
detecting, based on the monitoring, a second post of the first user's private data, the second post being from the second user to a third user in the social network;
based on the detection, masking the first user's private data from the third user using the stored generated mask pattern, the masking making the first user's private data inaccessible to the third user;
sending, to the first user, a private data request wherein the private data request includes the first user's private data and an identifier corresponding to the third user; and
unmasking the first user's private data in response to receiving, from the first user, an approval of the private data request, wherein the unmasking comprises displaying the first user's private data to the third user.

8. The information handling system of claim 7 wherein the generated mask pattern is based on a data type of the first user's private data.

9. The information handling system of claim 7 wherein the set of instructions perform additional actions comprising:
identifying the first post as including the first user's private data.

10. The information handling system of claim 9 wherein the set of instructions perform additional actions comprising:
analyzing the first post using a sensitive content analyzer; and
automatically identifying that the first user's private data is included in the first post based on the analysis of the first post.

11. The information handling system of claim 10 wherein the set of instructions perform additional actions comprising:
previously configuring, by the first user, one or more private data configuration settings, wherein the private data configuration settings are selected from the group consisting of one or more data types, one or more predetermined patterns, one or more matching instructions, and one or more analytic algorithms, wherein the analyzing utilizes the private data configuration settings.

12. The information handling system of claim 7 wherein the set of instructions perform additional actions comprising:

notifying the second user that the second post includes the first user's private data; and
allowing the second user to modify the second post in response to the notification and prior to a reception of the second post by the third user.

13. A computer program product stored in a computer readable storage device, comprising computer instructions that, when executed by an information handling system, causes the information handling system to control privacy in a social network by performing actions comprising:
posting a first post from a first user to a second user in the social network, wherein the first post includes private data of the first user;
generating a mask pattern, corresponding to the first user's private data, wherein the generated mask pattern is used to prevent one or more unauthorized users from viewing the first user's private data;
storing the generated mask pattern and the first user's private data in a data store;
monitoring one or more subsequent postings for the first user's private data;
detecting, based on the monitoring, a second post of the first user's private data, the second post being from the second user to a third user in the social network;
based on the detection, masking the first user's private data from the third user using the stored generated mask pattern, the masking making the first user's private data inaccessible to the third user;
sending, to the first user, a private data request wherein the private data request includes the first user's private data and an identifier corresponding to the third user; and
unmasking the first user's private data in response to receiving, from the first user, an approval of the private data request, wherein the unmasking comprises displaying the first user's private data to the third user.

14. The computer program product of claim 13 wherein the generated mask pattern is based on a data type of the first user's private data.

15. The computer program product of claim 13 wherein the actions further comprise:
identifying the first post as including the first user's private data.

16. The computer program product of claim 15 wherein the actions further comprise:
analyzing the first post using a sensitive content analyzer; and
automatically identifying that the first user's private data is included in the first post based on the analysis of the first post.

17. The computer program product of claim 16 wherein the actions further comprise:
previously configuring, by the first user, one or more private data configuration settings, wherein the private data configuration settings are selected from the group consisting of one or more data types, one or more predetermined patterns, one or more matching instructions, and one or more analytic algorithms, wherein the analyzing utilizes the private data configuration settings.

18. The computer program product of claim 13 wherein the actions further comprise:
notifying the second user that the second post includes the first user's private data; and
allowing the second user to modify the second post in response to the notification and prior to a reception of the second post by the third user.

* * * * *